United States Patent [19]
Michener

[11] Patent Number: 5,448,301
[45] Date of Patent: Sep. 5, 1995

[54] PROGRAMMABLE VIDEO TRANSFORMATION RENDERING METHOD AND APPARATUS

[75] Inventor: James A. Michener, Grass Valley, Calif.

[73] Assignee: The Grass Valley Group, Inc., Nevada City, Calif.

[21] Appl. No.: 248,794

[22] Filed: May 25, 1994

[51] Int. Cl.$^6$ .................... H04N 9/74; H04N 17/00; H04N 17/02
[52] U.S. Cl. .................... 348/578; 348/580; 382/293; 345/133; 345/135
[58] Field of Search .................... 348/580, 181, 578; 382/44, 46; 395/125, 142; 345/133, 135, 136, 137; H04N 9/74

[56] References Cited

U.S. PATENT DOCUMENTS

| | | | |
|---|---|---|---|
| 4,463,372 | 7/1984 | Bennett et al. | 358/22 |
| 4,468,688 | 8/1984 | Gabriel et al. | 358/22 |
| 4,472,732 | 9/1984 | Bennett et al. | 358/21 |
| 4,631,750 | 12/1986 | Gabriel et al. | 382/41 |
| 4,689,681 | 8/1987 | Jackson | 358/183 |
| 4,689,682 | 8/1987 | Jackson | 358/183 |
| 4,908,874 | 3/1990 | Gabriel | 382/46 |

*Primary Examiner*—James J. Groody
*Assistant Examiner*—Nina M. West
*Attorney, Agent, or Firm*—Francis I. Gray

[57] ABSTRACT

A programmable video transformation rendering method and apparatus regenerates an arbitrary reverse address map according to a transformation function representing a desired video effect by using a set of parameters that are run length encoded. Each scan line in target space for an output image is divided into one or more continuous line segments in source space for the input image using a continuous function for each line segment. The parameters for each line segment are determined, encoded, and stored for execution of the transformation function. For each line segment the parameters are updated, with only those parameters needing updated being stored together with the prior parameters that do not need to be updated. The continuous function is in the form of a polynomial equation and is a compromise between the amount of data generated and the calculations required.

8 Claims, 10 Drawing Sheets

PROGRAMMABLE VIDEO TRANSFORMATION RENDERING METHOD AND APPARATUS

BACKGROUND OF THE INVENTION

The present invention relates to video image transformation, and more particularly to a programmable video transformation rendering method and apparatus that is highly flexible for creating potentially an infinite number of video effects.

In television production it is often useful to take a video image, which is either directly generated by a camera or synthesized by other electronic means, and to transform the image, either a portion of the image or the whole image, in real time. Such a transformation may be simple, such as affecting the entire display raster and performing simple functions like vertical or horizontal displacement, or alteration of size, position or rotation. Transformations also may be complex, involving limited or multiple areas of the image in intricate, creative ways, such as an "exploding video picture" where the video image appears to break up into 100 shards and then each shard spins out in various directions from the center.

A generic digital picture manipulator, such as is described in U.S. Pat. No. 4,689,681 issued Aug. 25, 1987 to Richard A. Jackson entitled "Television Special Effects System" and embodied in the Kaleidoscope Digital Picture Manipulator manufactured by The Grass Valley Group, Inc. of Grass Valley, Calif., U.S.A., receives a video signal, representing an image in source space, and passes it through a two-dimensional (2D) lowpass filter, sometimes called a blurring or anti-aliasing filter. Depending upon the effect being implemented, the cutoff frequency of the filter may be adjusted on a pixel by pixel basis. A forward address generator generates write addresses for inputting the filtered video signal into a transform memory, as well as providing appropriate filter selection information for the 2D filter. A reverse address generator generates read addresses for outputting the video signal from the transform memory for display in target space. An address for both X and Y axes is generated for every output pixel in target space, the address for both axes having a precision in excess of an integer pixel address. The fractional, or "subpixel", portion of the address is used to perform a simple linear four point interpolation to determine the pixel value in target space. However the transformations available in such a digital picture manipulator are limited to a specific set, and are not flexible enough to readily perform new transformations without modification of the existing product.

What is desired is a highly flexible programmable realtime video image transformation rendering method that permits a virtually unlimited number of creative video effects.

SUMMARY OF THE INVENTION

Accordingly the present invention provides a programmable video transformation rendering method that regenerates an arbitrary reverse address map for each portion of a scan line for an output image selects an appropriate equation and sends a group of appropriate constants to a renderer. The scan line in target space for the output image is fitted to a continuous line segment in source space for the input image according to a continuous function having equality at a specified set of points. The error is determined between the continuous function and the input image at points intermediate the specified set of points, and if the error exceeds a threshold the continuous line segment is subdivided until the error is below the threshold. The resulting parameters for each continuous line segment are encoded to reduce the total number of instructions needed to load the parameters into a register for each continuous line segment. The transform function is executed using the parameters in the register for each continuous line segment to produce the reverse address map that renders the output image in target space.

The objects, advantages and other novel features of the present invention are apparent from the following detailed description when read in conjunction with the appended claims and attached drawing.

DESCRIPTION OF THE PREFERRED EMBODIMENT

Figure 1:
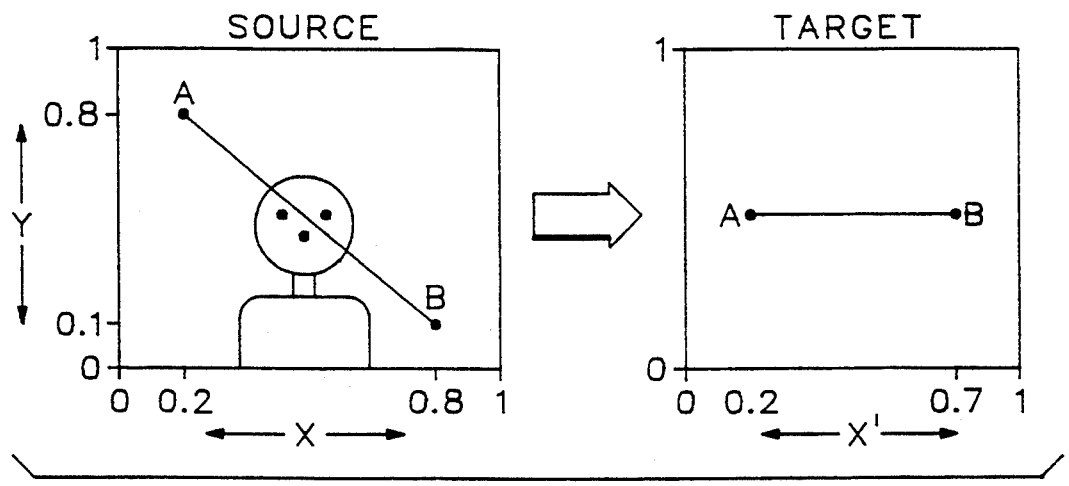
FIG. 1 is a pictorial view representing the rendering of an image from a source space to a target space according to the present invention.

Referring now to FIG. 1 a source image is to be transformed into a target image such that a line AB in the source image is transformed into a portion of a scan line AB in the target image. Although this example only uses a single source and two dimensions, the concepts involved may be expanded to multiple sources and four dimensions, including the depth and temporal dimensions. But for illustration this simple case is presented. The values for the source addresses may be computed using a linear equation:

$$Y = m*X + b$$

The appropriate constants are a slope (m) and an intercept (b). A more appropriate form of the equation would be an initial condition and a slope.

In this case at the point A the initial condition for X is 0.2, and it increases at the rate of 1.2 times that of the X' displacement in the target image. For Y at point A the initial condition is 0.8, and it decreases at a rate 1.4 times that of the X' displacement. Thus the instructions for this line segment AB are that the relationship between X and Y may be established using an equation for a line, with initial parameters of Xo=0.2, Yo=0.8, Xinc=1.2 and Yinc=−1.4. That is a sufficient set of data so that a renderer may recreate a full set of address data to properly scan the source image to create the target image.

The possible set of equations that may be employed by this method is endless. Any common mathematical series representing a continuous line segment may be used as well as fractal equations. The preferred series, however, is a simple polynomial expression due to the following advantages:

easy implementation using a minimum amount of circuitry to do the calculation; and availability of relatively simple and efficient algorithms for matching a desired trajectory in the source image into the target image.

The straight line example given above is a first order polynomial. This first order case is the minimum set required to do general transformations. A piecewise approximation may be done to better match a desired trajectory in the source image. For example if errors due to the fact that straight line approximations are done for the generation of both X and Y addresses are greater than a threshold, then the line segment in the target image may be broken into two or more segments to decrease the overall error.

Depending upon the trajectory between source and target that needs to be matched, two things may be done to decrease the errors with polynomial series. Either the line segment may be broken up into smaller pieces as indicated above, or a higher order polynomial may be used. An additional constant is required for each additional order of the polynomial. In either case more information is needed to recreate the addresses of the source space. For the example of the complex shard transformation, second or third order polynomials are sufficient to produce excellent results.

If the video shard in the target space is to look proper, the addresses for the start and end point of each line should have a minimum error. If a first order polynomial is used (a straight line), it is defined by these end points. If a second order polynomial is used, two of the three degrees of freedom are used by the end point criteria. A numerically simple approach is to also have zero error at the mid point between the end points. A reasonably simple estimate of the resulting error is obtained by computing the error at the quarter points. If a third order polynomial is used, two of the four degrees of freedom are used by the end point criteria. A numerically simple approach is to have zero error at the triple points between the end points. A reasonable error estimate is obtained by computing the error at the 1/6th points.

An algorithm for programmable transformation rendering of a target image from a source image according to a given transformation function is:

1. For a given scan line in the target image find a continuous line segment in the source image that maps to the scan line.

2. Compute the reverse addresses for the line segment at the end points.

3. If it is known that a straight line fit will cause error either due to experience on a previous line or the nature of the transform, skip to step 6. Otherwise for each parameter of the reverse address fit a line based on the two endpoints:

If point A1 (source) is transformed to X1 (target) and A2 is transformed to X2, find m and b for the linear equation:

$X = m*A + b$ $m = (X2 - X1)/(A2 - A1)$ ... slope
$b = X1 - m*A1$ ... intercept 4. (Optional) If the target line segment is short, i.e., less than six pixels, go with the linear equation.

5. Compute the reverse address at the mid point:

$Amp = A \text{ mid point} = (A1 + A2)/2$

Compare the value computed due to the linear approximation with the linear equation of step 3. If the difference, or error, is low enough, stop.

6. For the following polynomial equation:

$X = a*A*A + b*A + c$ where the equation is true at the end points and the mid point, $f(A) = X1, A = A1$ $f(A) = X2, A = A2$ $f(A) = Xmp, A = Amp$ solve the linear set of equations for a, b and c.

7. Compute the transform for the reverse addresses at the quarter points $Aqp1 = \text{first quarter point} = A1 + (A2 - A1)/4$ $Aqp2 = \text{second quarter point} = A1 + 3*(A2 - A1)/4$ Compute the error at the quarter points. If the error is within limits or if the line segment is too short, i.e., less than ten pixels, then stop. If the error is excessive at either quarter point, then split the target space scan line in two and return to step 6.

The algorithm may be expanded further as follows:

8. If the error from step 7 is excessive compute the reverse addresses at the triple points:

$Atp1 = \text{first triple point} = A1 + (A2 - A1)/3$ $Atp2 = \text{second triple point} = A1 + 2*(A2 - A1)/3$ 9. For the following equation $X = a*A*A*A + b*A*A + c*A + d$ given that this equation is true at the endpoints and triple points:

$f(A) = X1, A = A1$ $f(A) = X2, A = A2$ $f(A) = Xtp1, A = Atp1$ $f(A) = Xtp2, A = Atp2$

Solve the linear set of equations for a, b, c and d.

10. Compute the transform addresses at the sixth points:

$Asp1 =$ first sixth point $= A1 + (A2 - A1)/6$ $Asp2 =$ second sixth point $= A1 + 5*(A2 - A1)/6$ Compute the error at the sixth points and the midpoint. If the error is within limits or if the line segment is too short, i.e., less than ten pixels, then stop. If the error is out of limits on any of the three line segments, then the end points for new target space scan line segments have been computed and return to step 5 for each segment.

The unexpanded algorithm (steps 1-7) above is the quickest to compute, but may generate more data. The expanded algorithm (steps 1-10) generates less data, but takes more time to compute.

Figure 2:
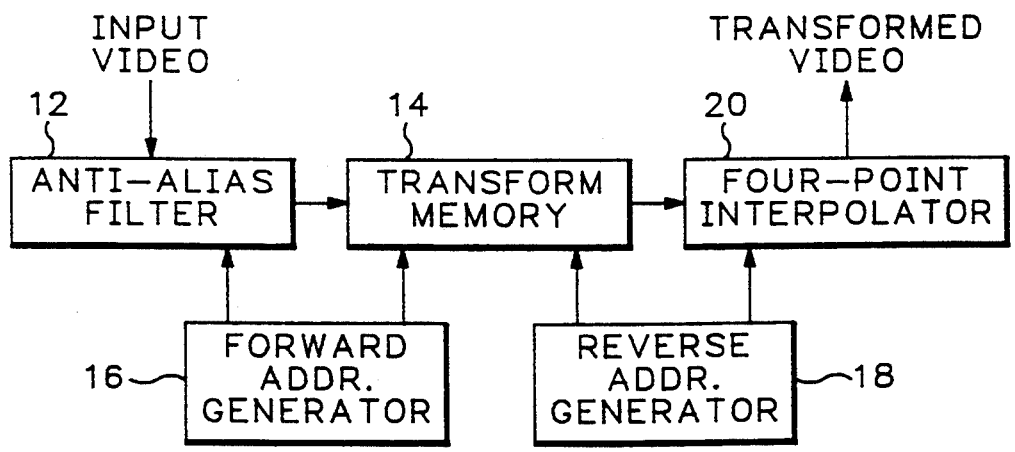
FIG. 2 is a general block diagram view of a digital picture manipulator for programmable video transformation rendering according to the present invention.

Referring now to FIG. 2 a digital picture manipulator (DPM) for performing transformations on an input video signal that represents an image in source space is shown. As discussed with reference to U.S. Pat. No. 4,689,681 above, the DPM has an input filter 12 through which the video signal passes. The filtered video signal is stored in a transform memory 14 under control of a forward address generator (FAG) 16, which may also control the particular filter selected as the input filter 12. A reverse address generator (RAG) 18 generates pixel addresses for target space based on the location of neighboring pixels in source space according to a desired transformation between source and target spaces. Since the pixel in target space generally does not coincide with a pixel in source space, the pixel address from the RAG 18 has an integer portion and a fractional portion that defines the location of the pixel for target space in terms of a point in source space that is within an area defined by four pixels in source space. These four pixels are read out from the transform memory 14 according to the integer portion of the readout address and are input to an interpolator 20 which combines the four pixels from source space into a pixel for target space according to the fractional portion of the readout address. The output of the interpolator 20 is a transformed video signal that represents the image in target space.

Figure 3:
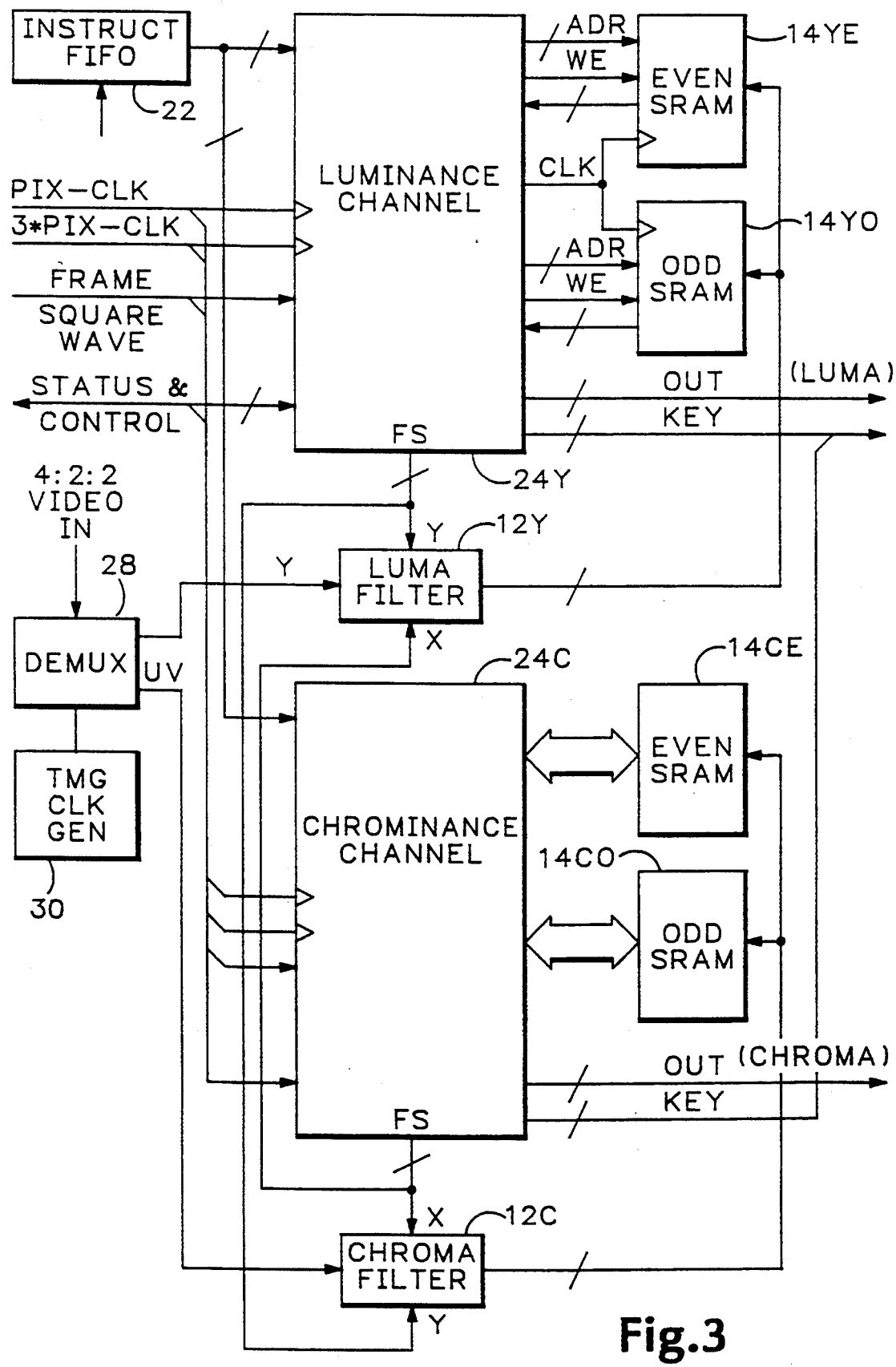
FIG. 3 is a detailed block diagram view of a digital picture manipulator for programmable video transformation rendering according to the present invention.

As shown in FIG. 3 a circuit, which may be embodied on a single digital video effects (DVE) circuit board, is shown that implements the DPM of FIG. 2 in a programmable architecture to perform the algorithms outlined above. The circuit is programmable from a controller (not shown) to provide the flexibility desired to produce a virtually unlimited range of video effects. For the circuit to be flexible using the reverse transform model, every pixel in target space needs to be supplied with a reverse address (both X and Y). The precision required for both X and Y addresses to allow for sufficient subpixel accuracy is of the order of 32 bits per address, i.e., as compared to video data of generally 8 bits per pixel, which is four times more data than the actual picture. So that the transform circuit may be controlled on a realtime, or near realtime basis, hardware assist is provided, and instructions are data compressed to generate a set of reverse addresses. Although regeneration of an arbitrary reverse address map in its simplest form uses a straight line, or linear (first order) polynomial, such an approach causes too much data to be generated for a given error load. Second and third order polynomials provide good realizations, with the second order polynomials providing more data than third order polynomials. The second order polynomial however provides a good compromise between calculations and data, as described below. For every line or portion of a line in the target image, a set of parameters for second order polynomials for both X and Y is provided which describes from where in the source image the target pixel is derived. These instructions are run length encoded as explained below, giving the number of pixels to hold these parameters, so that it is possible to have several different sets of parameters on any given video line for complex effects.

An instruction first-in, first-out (FIFO) register 22 receives instructions from the controller according to a desired transformation. The instructions from the FIFO 22 are input to a luminance channel application specific integrated circuit (ASIC) 24Y and to an identical chrominance channel ASIC 24C for processing of the video data. The instructions have both command words and data words. The luminance and chrominance channel ASICs 24Y, 24C include the FAG 16, RAG 18 and interpolator 20 shown in FIG. 2. The input video signal, such as 4:2:2 format digital video, is input to a demultiplexer 28 to separate the luminance Y and chrominance components UV under control of a timing clock generator circuit 30, as is well known in the art. The components Y, UV are applied to the input filter 12Y, 12C. The parameters of the input filter 12Y, 12C are determined by a filter select (FS) output from the channel ASICs 24Y, 24C. The component outputs from the input filter 12Y, 12C are input to the respective portions of the transform memory 14, which in this embodiment is divided into a chrominance portion 14C and a luminance portion 14Y, with each portion divided into even E and odd O banks.

Each channel ASIC 24 has as inputs the instructions from the instruction FIFO 22, a pixel clock PIX_CLK, a clock at three times the pixel clock rate 3*PIX_CLK to read out four pixels for interpolation within one pixel interval and write in one pixel (two pixels per cycle from each bank of the transform memory 14 and one pixel per cycle into one of the banks from the filter 12), and a frame square wave, or frame pulse FP. Each channel ASIC also provides addresses and write enable signals together with a clock to its associated portion of the transform memory 14, receives pixel data from the transform memory for interpolation, and provides a transformed output signal together with an associated key signal.

Via the instructions the polynomial variables for the RAG and the filter data for input filter selection are loaded into the channel ASIC 24 on an as needed basis in the form of run length encoded data, but at least once every line. As indicated for some effects several parameters may be updated more than once per line. The data provided are the parameters for a second order polynomial in both X and Y as they map the target space from the source space. The controller computes the reverse transform according to operator inputs and converts the transform into the run length encoded instructions. Due to the compute time complicated effects cannot be performed "on the fly", but precomputed effects can be run in real time.

Figure 4:
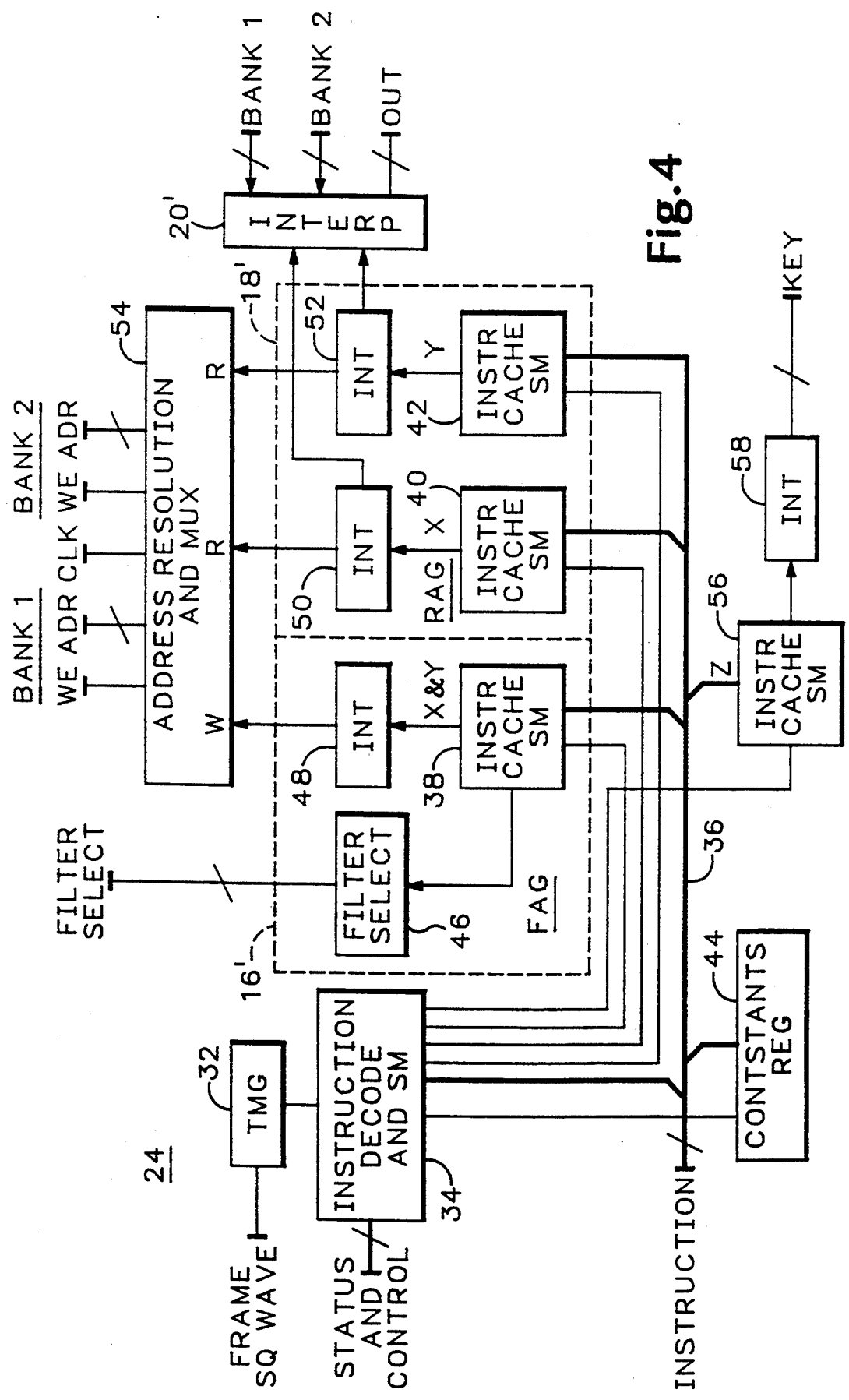
FIG. 4 is a block diagram view of a programmable transformation channel for the digital picture manipulator of FIG. 3.

The channel ASIC 24 is shown in greater detail in FIG. 4. The frame pulse (FP) signal is input to a timing generator 32 that produces the timing signals necessary to decode the instructions. The timing signal is input to an instruction decoder state machine 34. The instruction decoder state machine 34 receives control signals from the controller and provides status information to the controller. The instruction decoder state machine 34 also is coupled to an instruction bus 36 to receive instructions for decoding and to generate enable signals for loading data from the instructions into various circuit elements, such as four instruction cache state machines (ICSMs) 38, 40, 42 and a constants register 44. A filter select circuit 46, which receives parameter data from a forward address ICSM 38, and a single Euler integrator 48, which also receives parameter data from the forward address ICSM, form the forward address generator 16'. A pair of second order Euler integrators 50, 52 together with their associated ICSMs 40, 42 form the reverse address generator 18'.

The ICSMs 38, 40, 42, 56 provide storage for all the constants required by the Euler integrators 48, 50, 52, 58. For each set of constants stored there is a run length, or how long the constants remain true, in terms of target pixels. The Euler integrators 48, 50, 52, 58 take the constants from the ICSMs 38, 40, 42, 56 to generate a reverse address. The address resolution and multiplexer circuit 54 takes the integer portions of the X and Y reverse addresses from the second order Euler integrators 50, 52 and increments those values to generate the four read addresses for the memory 14 ($X_I,Y_I$, $X_I,Y_{I+1}$; $X_{I+1},Y_I$, $X_{I+1},Y_{I+1}$) that surround the reverse address in source space. The pixel values at those four addresses from source space are input from the memory 14 into the integrator 20' together with the fractional portions of the reverse addresses ($X_F$, $Y_F$) from the second order Euler integrators 50, 52. The resulting interpolated value is output as the target pixel value for that reverse address.

Figure 5:
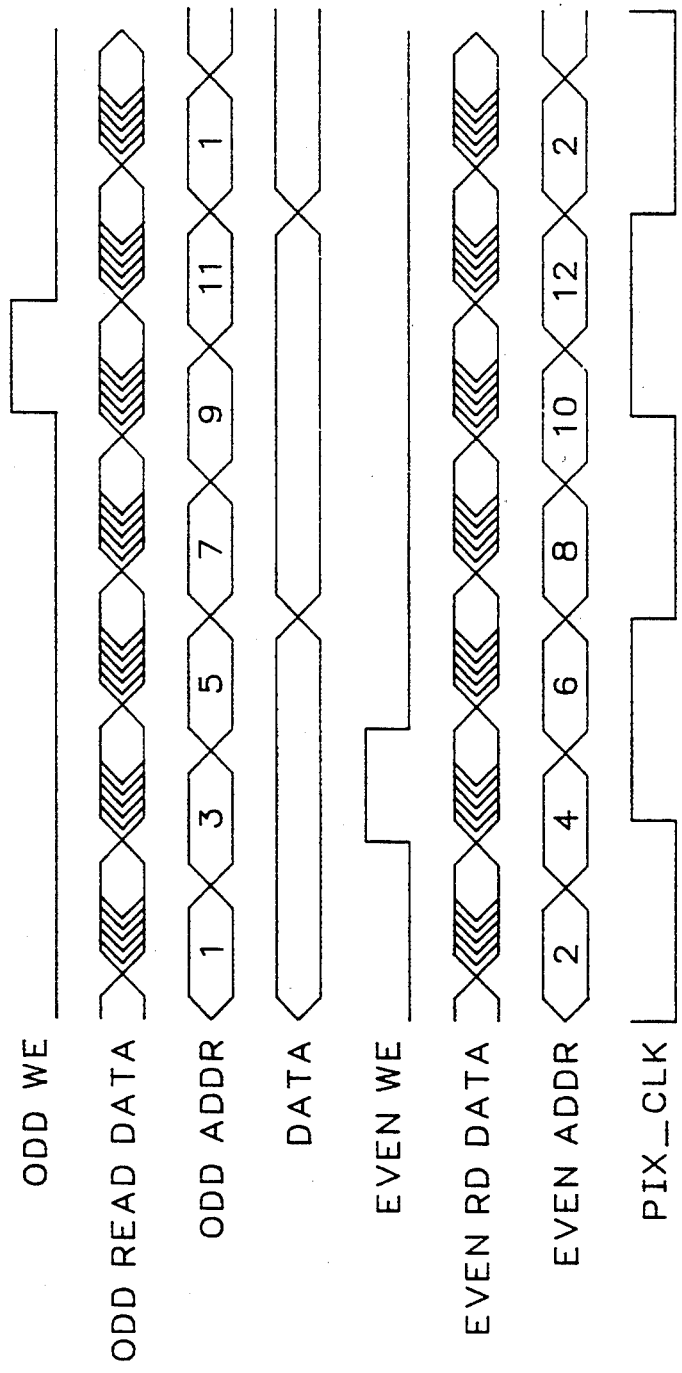
FIG. 5 is a timing diagram for the programmable transformation channel of FIG. 4.

Referring now to the timing diagram of FIG. 5 the forward address is provided once per pixel cycle in the middle of the pixel cycle to write a pixel from source space into the transform memory 14. As indicated there are two write and four read cycles per pixel cycle, with only one of the write cycles being used. Four read addresses are provided per pixel cycle to read out from the transform memory 14 four pixels into the interpolator 20' to obtain the corresponding target pixel. An address resolution and multiplexer circuit 54 generates the write enable signal WE for the appropriate bank from the least significant bit of the write address, and provides the write and read addresses at the appropriate time to assure the proper write/read operations. The channel ASIC 24 also has a key channel that includes a key ICSM 56 and another double Euler integrator 58 to transform the key in parallel with the video.

Figure 6:
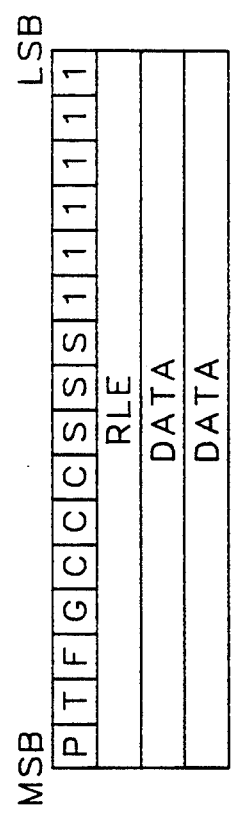
FIG. 6 is an illustration of an instruction word for the programmable transformation channel of FIG. 4.

Each instruction for the programmable DPM may be a 16-bit word, as shown in FIG. 6. The first bit is a parity bit P for the instruction to provide parity for the instruction data. The second bit T is a switch between loading runtime data and loading constant data. The third bit F defines how the next instruction word is interpreted, either a constant value or a value indicating the number of constant values to follow. The fourth bit G defines how the next three bits are to be interpreted, either globally to all ASICs 24 or to a particular ASIC. The next three bits C define the individual ASIC address to which an instruction is directed and matches mode lines hardwired to the ASIC. The remaining bits A define an address for an internal constant. In the run mode the A bits become three S bits, indicating which ICSM 38, 40, 42, 56 is being addressed by the instruction, and I bits, or individual flag bits, defining which constants within the addressed ICSM are to be changed by this instruction. For all I bits with a value of "1", a constant value data word follows. If all of the I bits have a value of "0", then the instruction is treated as a NOP for run length count. The address either freezes or jumps to a RAG freeze address. Therefore an instruction is followed by a fixed number of bytes determined by the I bits that are activated, and then by a run length value indicating the number of pixels in target space for which the run data of the instruction are applicable before a new instruction is accessed for execution.

As an example the S bits may be defined as follows:

| | |
|---|---|
| 0:000 | X - Reverse Address Generator 40 |
| 1:001 | Y - Reverse Address Generator 42 |
| 2:010 | Z - Reverse Address Generator 56 |
| 3:011 | Filter Select/FAG X & Y Generator 38 |
| 7:111 | Global |

The I bits for the reverse address generators 40, 42, 56 may be defined as follow:

| | |
|---|---|
| I5 and I4 | 32-bit value for second order term of Euler integrator |
| I3 and I2 | 32-bit value for first order term of Euler integrator |
| I1 and I0 | 32-bit value for zeroth order term of Euler integrator. |

The I bits for the filter selector/forward address generator 38 may be defined as follow:

| | |
|---|---|
| I5 | 16-bit value for first Euler term of Euler integrator (filter select) |
| I4 | 16-bit value for zeroth Euler term of Euler integrator (filter select) |
| I3 | 16-bit value for first Euler term of Euler integrator (Y forward address) |
| I2 | 16-bit value for zeroth Euler term of Euler integrator (Y forward address) |
| I1 | 16-bit value for first Euler term of Euler integrator (X forward address) |
| I0 | 16-bit value for zeroth Euler term of Euler integrator (X forward address) |

Figure 7:
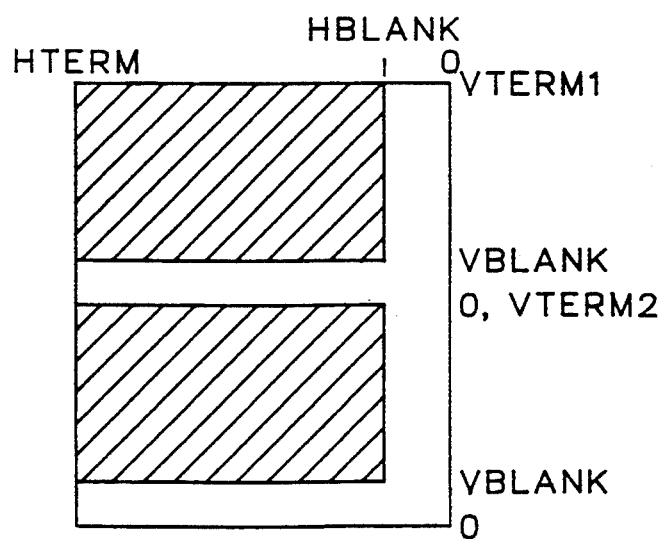
FIG. 7 is an illustrative view of a frame of video data according to the present invention.
Figure 8:
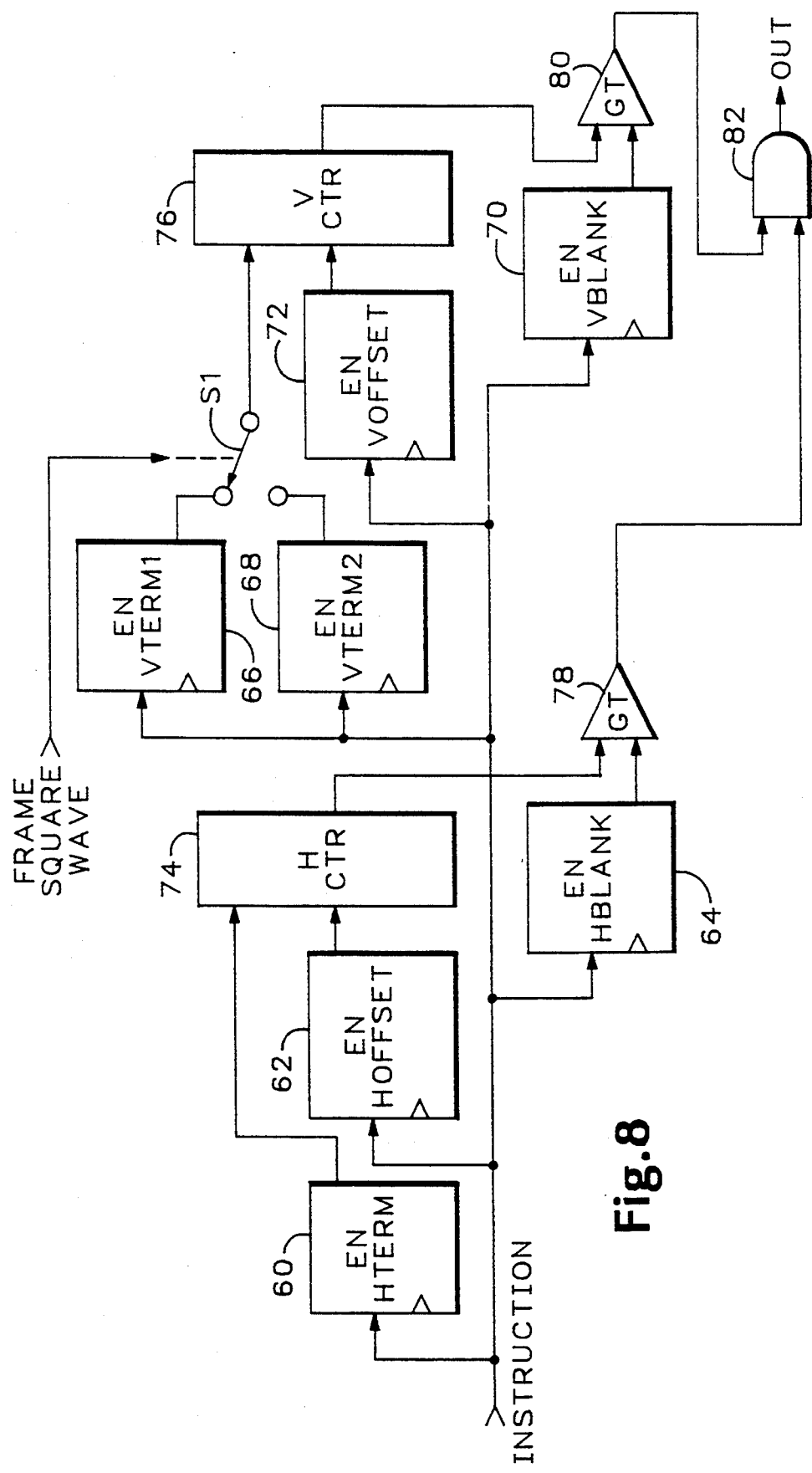
FIG. 8 is a block diagram view of a timing generator according to the present invention.

The frame pulse is the basic timing input and all timing is derived from that signal. An internal frame is shown in FIG. 7, and the timing generator 32 is shown in more detail in FIG. 8. There are several registers that store various constants regarding field timing, and a pair of counters. A horizontal count of zero is the sample before the start of active video, and a vertical count of zero is the sample before the first line of active video. For example in the NTSC system there are 858 samples per line, so that HTERM is set to 857. For 720 samples of active video per line there are 138 samples of blanking, so HBLANK is set to 137. For the two fields one field is 262 lines and the other 263 lines, so that VTERM1 is set to 261 and VTERM2 is set to 262. If the blanking width is 20 lines, then VBLANK is set to 20. HOFFSET and VOFFSET define where in the frame the counters jump to when the frame pulse goes from high to low.

The registers that store the various constants are part of the constant registers 44 that are loaded from the instruction bus during a constant load (non-runtime) operation (T=0). HTERM is loaded into an HTERM register 60, HOFFSET is loaded into an HOFFSET register 62, HBLANK is loaded into an HBLANK register 64, VTERM1 is loaded into a VTERM1 register 66, VTERM2 is loaded into a VTERM2 register 68, VBLANK is loaded into a VBLANK register 70 and VOFFSET is loaded into a VOFFSET register 72. An H counter 74 is loaded with HTERM as modified by HOFFSET at the beginning of each line, while a V counter 76 is loaded with the appropriate VTERM as modified by VOFFSET at the beginning of each field. The appropriate VTERM is selected by a switch S1 controlled by the state of the frame square wave. The H counter counts down at a pixel clock rate and is reloaded at the end of each line, while the V counter counts down at a line rate and is reloaded at the end of each field. The output from the H counter 74 is compared with HBLANK from the HBLANK register 64 in a H comparator 78 to identify the active video portion of each line, and the output from the V counter 76 is compared with VBLANK from the VBLANK register 70 in a V comparator 80 to identify the active video lines for each field. The outputs from the comparators 78, 80 are input to an AND gate 82 to provide a signal indicative of the active video time for each frame.

Figure 9:
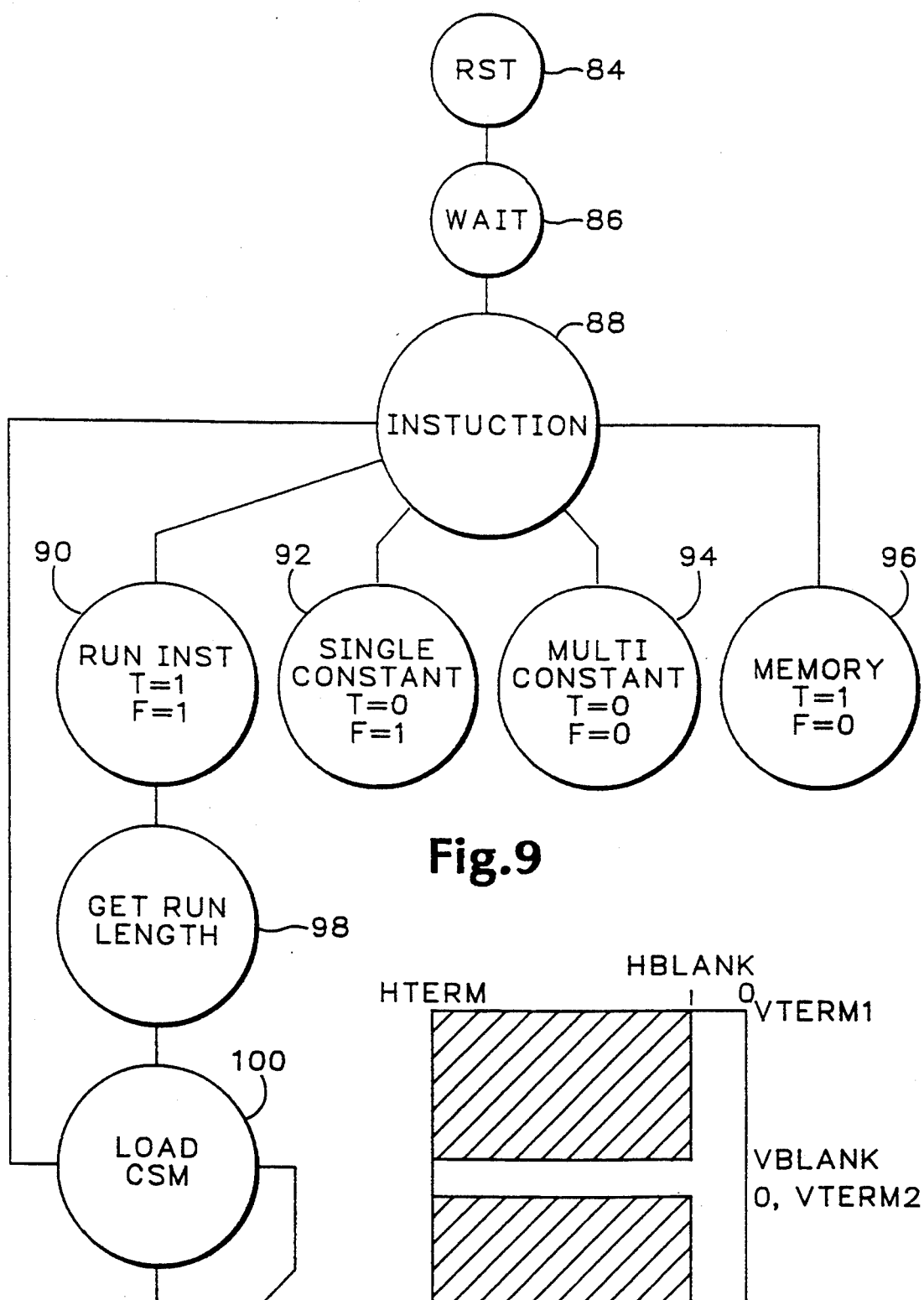
FIG. 9 is a state diagram view for the an instruction decoder state machine for the programmable transformation channel according to the present invention.

The instruction decode state machine 34 is the controlling state machine for the ASIC 24. It monitors the instructions coming to the ASIC, direct hardware inputs such as RESET, and status from all the ICSMs 38, 40, 42, 56 as well as controlling FIFO controls. The states as shown in FIG. 9 are RESET 84 when the reset line is activated; WAIT 86 to hold things between instructions; INSTRUCTION 88 when an instruction is received. INSTRUCTION 88 is an active state that determines what type of instruction is received according to the T and F bits of the instruction word: RUN 90 (T=1, F=1), SINGLE_CONSTANT 92 (T=0, F=1), MULTI-CONSTANT 94 (T=0, F=0) or MEMORY 96 (T=1, F=0). For the RUN instruction a run length is extracted (step 98) and then the addressed ICSM is loaded with the data (step 100). Once the ICSM is loaded, the INSTRUCTION state 88 is returned to for another instruction.

Figure 10:
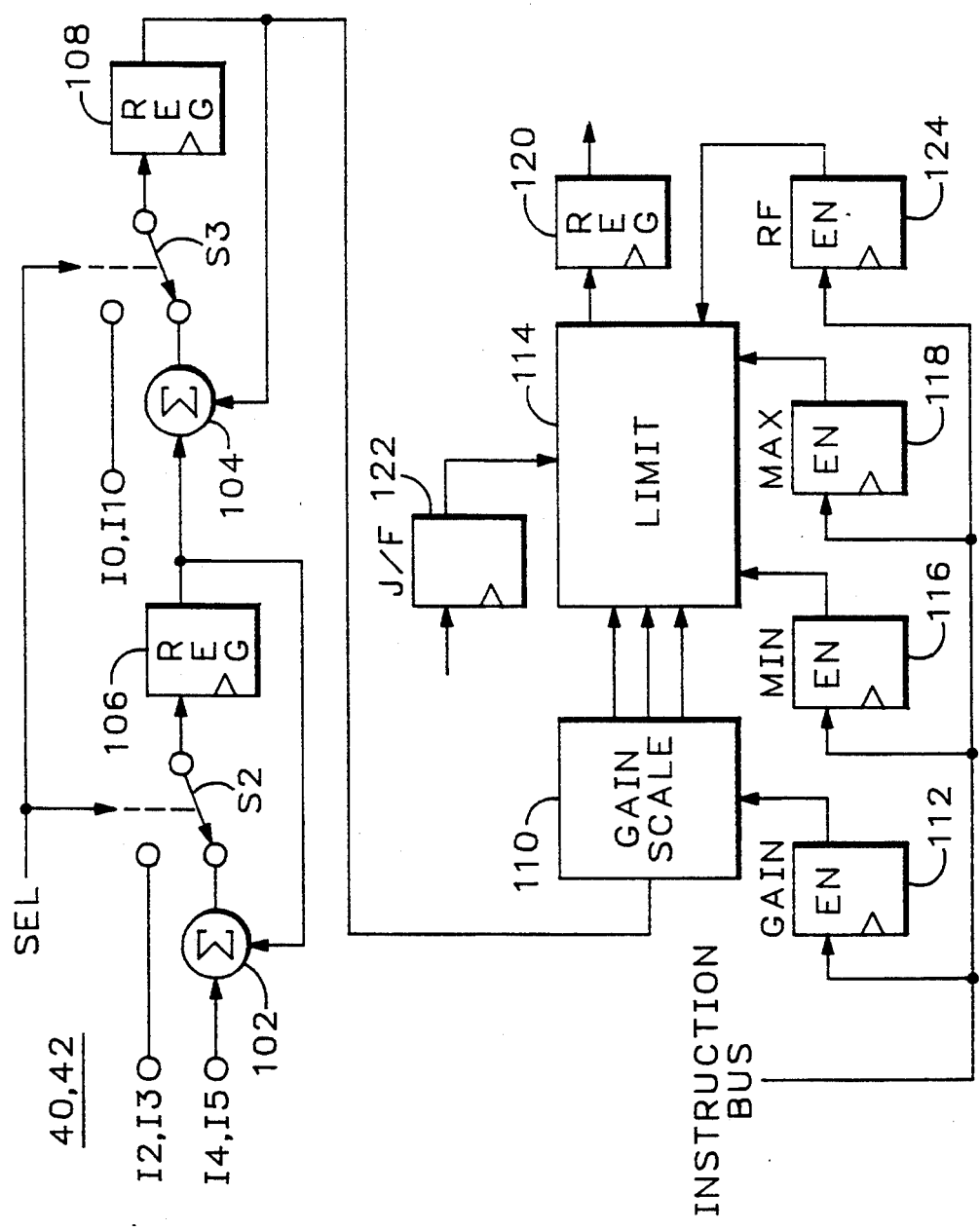
FIG. 10 is a block diagram view of a programmable reverse address generator according to the present invention.

An example of one of the second order RAG Euler integrators 40, 42 is shown in FIG. 10. A pair of summing circuits 102, 104, a pair of switches S2, S3 and a pair of accumulator registers 106, 108 with appropriate feedback paths form the integrator. The output from the second accumulator register 108 is input to a gain scale circuit 110 that is controlled by a GAIN value loaded by instruction into a gain register 112. The scaled value from the gain scale circuit 110 is input to a limit circuit 114 that has limits MIN and MAX for respective registers 116, 118. The limit circuit 114 provides for the situation where the target image is expanded so that some of the original source image lies outside the target area. The resulting address from the limit circuit 114 is clocked into an output address register 120. For a no operation (NOP) run instruction either the current address in the output register 120 remains unchanged or a jump address loaded from a jump register 124 is loaded by the limit circuit 114 into the output register, depending upon the mode bit loaded into a RAG Freeze register 122.

Figure 11:
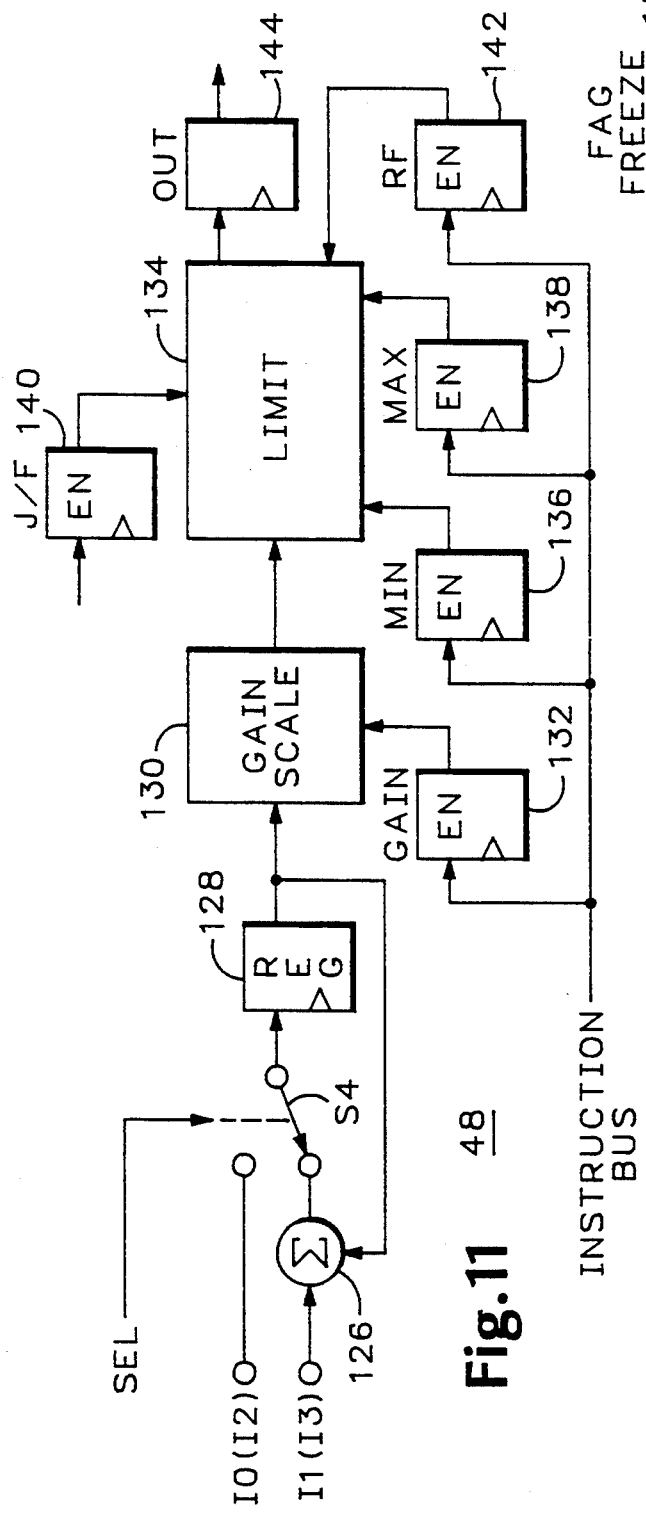
FIG. 11 is a block diagram view of a programmable forward address generator according to the present invention.
Figure 12:
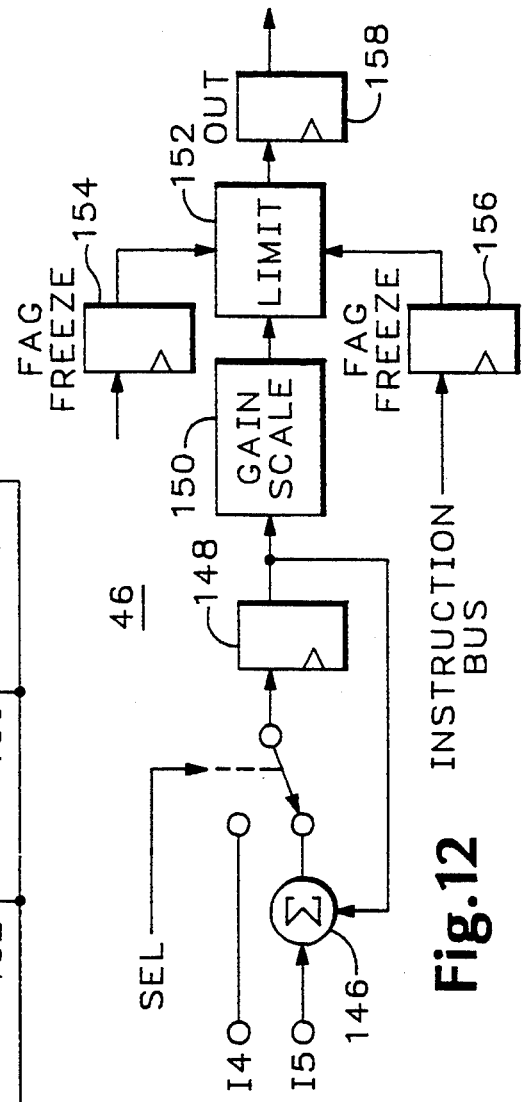
FIG. 12 is a block diagram view of a programmable filter select circuit according to the present invention.

One of the first order FAG Euler integrators for generating the write addresses is shown in FIG. 11. A single summation circuit 126, switch S4 and accumulator register 128 with appropriate feedback path form the integrator, and a gain scale circuit 130 with associated register 132 and a limit circuit 134 with associated registers 136, 138, 140, 142 provide a forward address that is clocked into an output forward address register 144. The filter select circuit 46, one element of which is shown in FIG. 12, is very similar to the FAG integrator 48. For each filter section there is a separate filter select integrator.

Figure 13A:
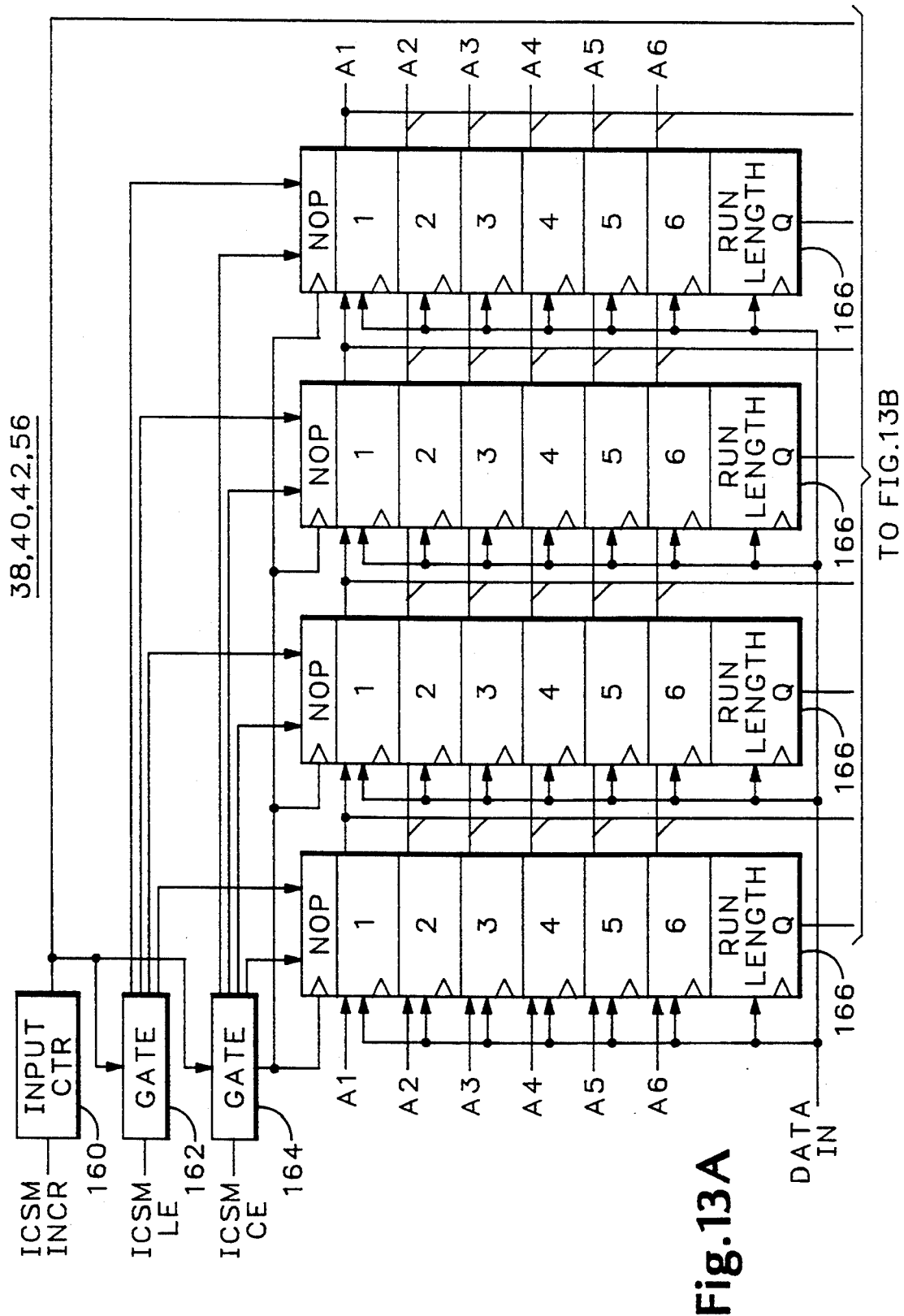
FIG. 13 is a block diagram view of an instruction cache state machine according to the present invention.
Figure 13B:
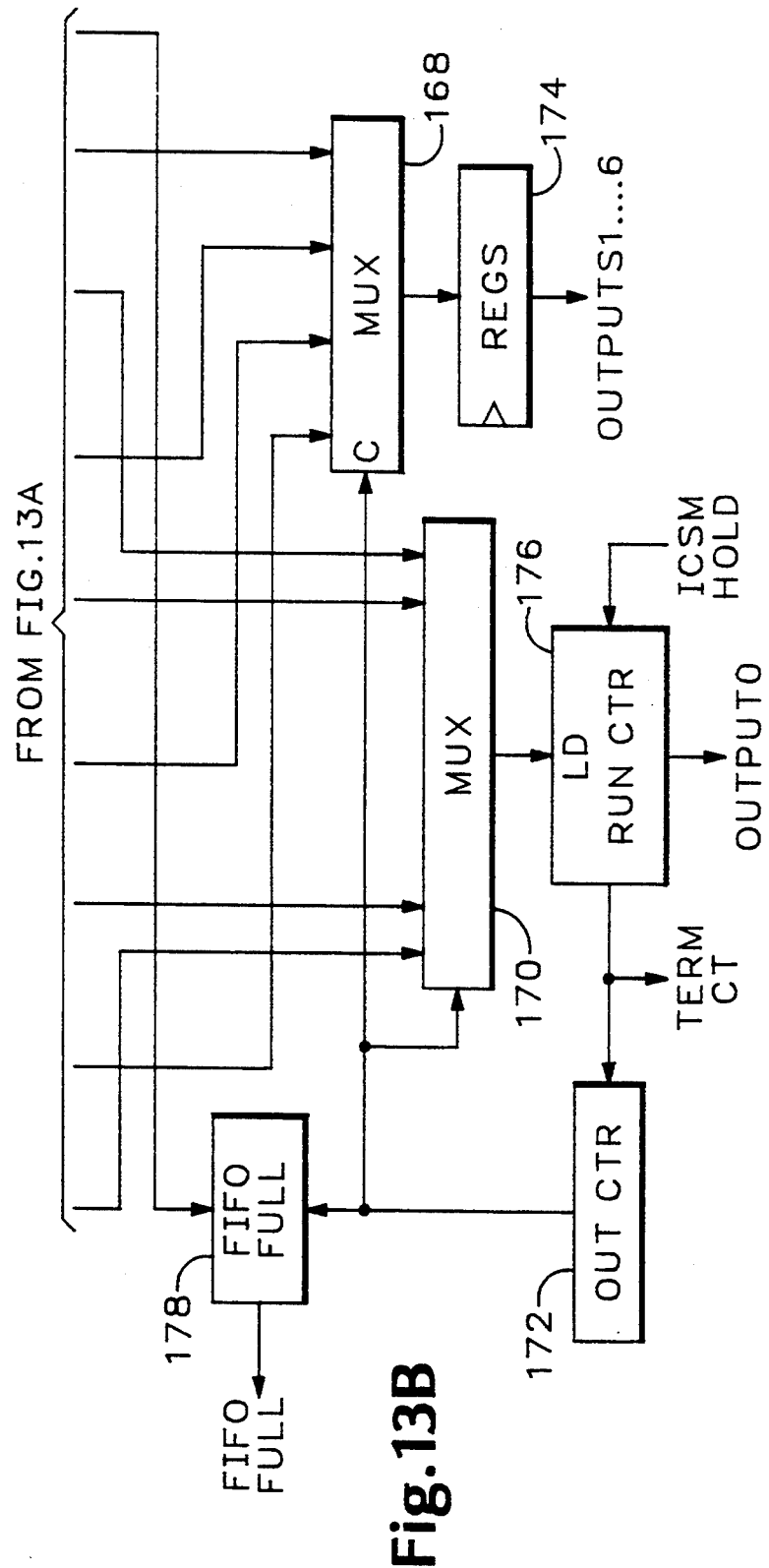

Each ICSM 38, 40, 42, 56, as shown in FIG. 13, has an input counter 160 that is incremented by an ICSM increment enable command. The output from the input counter 160 indicates which column of FIFOs is being written into, as is explained below, and is advanced with each ICSM increment enable command to circulate through each column. A load enable gate 162 applies a load enable command to one of the FIFOs in the column being written into as determined by the input counter 160 according to an ICSM load enable command. Likewise a copy enable gate 164 applies a copy enable command to one of the FIFOs in the column being written into as determined by the input counter 160 according to an ICSM copy enable command. The enable commands are provided by the instruction decode state machine 34. Each FIFO 166 in each column has a pair of inputs, a pair of enable lines and a clock input. The first six FIFOs in each column provide parameter values, and the last FIFO in each column provides a run length value. The inputs to the parameter FIFOs are either from the data line or from the corresponding FIFO in the immediately preceding column. If the I bit in the instruction command has a "1" bit for the given parameter FIFO, then the ICSM load enable signal enables that FIFO so that the parameter value is taken from the data line. If the I bit in the instruction command has a "0" bit for the given parameter FIFO, then the ICSM copy enable signal enables that FIFO so that the parameter value is copied from the corresponding FIFO in the immediately preceding column.

The parameter values from each column of FIFOs 166 are input to a parameter multiplexer 168. The run length values from the run length FIFOs for each column are input to a run length multiplexer 170. An output counter 172 provides a select signal input to the parameter and run length multiplexers 168, 170. According to the select signal input the parameters from one column are passed by the parameter multiplexer 168 to a set of registers 174 that store the six parameter values for use by the corresponding integrator/filter select circuit 46, 48, 50, 52, 58. At the same time the corresponding run length value is loaded via the run length multiplexer 170 into a run counter 176. The run counter 176 counts down on a pixel basis for the line in target space from the start of the presently executing run instruction. When the run counter 176 reaches its terminal count, the terminal count increments the output counter 172 so that the next instruction is transferred via the multiplexers 168, 170 to the parameter registers 174 and run counter 176. The currently executing column indicated by the output counter 172 is input together with the currently written column as indicated by the input counter 160 to a FIFO full logic circuit 178. If the input counter 160 indicates it wants to write an instruction into the column indicated by the output counter as currently being executed, then a FIFO FULL signal is output, and no further instructions are transferred to the ICSM until the FIFO FULL signal drops.

In operation a central processing unit (CPU) computes the parameters required to perform any given digital video effect. For complex effects, such as the exploding shards, such computation is too intensive to be performed "on the fly", so is done "off-line". The parameters are formed into instructions for the given digital video effect that are compressed using run length encoding. The instructions include constants that are updated no more often than once per frame, and run constants that are updated at least once per line according to the particular effect created. These instructions for a given effect are loaded from the CPU into the instruction FIFO 22. The instructions from the instruction FIFO 22 are then loaded as needed into ICSMs 38, 40, 42, 56 and constant registers 44 on each channel chip 24. The input video is filtered and loaded into the memory 14 according to filter selects and write addresses determined by the instructions in the appropriate forward address ICSM 38. For each pixel in target space on a line, reverse addresses X and Y are generated by second order Euler integrators 50, 52 according to parameters in the respective ICSMs 40, 42. The integer portions of the reverse addresses are converted into four read addresses by the address resolution circuit 54 to obtain four pixel values from memory 14 for input to the interpolator 20'. The four pixel values are interpolated according to the fractional portions of the reverse addresses X and Y to produce the target pixel value that is output in target space.

Thus the present invention provides a programmable video transformation rendering method and apparatus for performing virtually unlimited numbers of digital video effects by regenerating an arbitrary reverse address map as a set of run length encoded instructions that have parameters computed using polynomial equations according to a particular desired digital video effect, the parameters being loaded into instruction cache state machines that control integrators from which memory addresses are generated at least once per line, and more often depending upon the complexity of the digital video effect.

What is claimed is:

1. A method of programmable video transformation rendering that regenerates an arbitrary reverse address map to produce a target image from a source image according to a transformation function representing a particular one of a virtually unlimited number of digital video effects comprising the steps of:
    for a given scan line in the target image, finding a continuous line segment that maps to the source image according to the transformation function;
    fitting a continuous function equation to the continuous line segment that has equality at a first specified set of points;
    determining an error between the continuous line segment and the continuous function equation at a second specified set of points intermediate the first specified set of points;
    if the error at any one of the second specified set of points is above a given limit, subdividing the continuous line segment into shorter continuous line segments;
    repeating the fitting, determining and subdividing steps for each shorter continuous line segment until the error is below the given limit for each of the second specified set of points;
    storing parameters for the continuous function equation for each continuous line segment; and
    executing the transform function according to the stored parameters for each continuous line segment to produce the target image from the source image.

2. The method as recited in claim 1 further comprising the step of encoding the parameters into run length encoded instructions before storing in the storing step.

3. The method as recited in claim 2 wherein the run length encoded instructions for each continuous line segment include a command instruction having a flag bit for each parameter to be updated in the storing step followed by data instructions for each parameter to be updated and a run length data instruction to indicate the number of consecutive pixels to use the updated parameters in the executing step.

4. The method as recited in claim 1 wherein the continuous function equation is a polynomial function.

5. The method as recited in claim 4 wherein the polynomial function is a first order polynomial.

6. The method as recited in claim 4 wherein the polynomial function is a second order polynomial.

7. The method as recited in claim 4 wherein the polynomial function is a third order polynomial.

8. An apparatus for programmable transformation rendering that regenerates an arbitrary reverse address map to produce a target image from a source image according to a transform function representing a particular one of a virtually unlimited number of digital video effects comprises:
    a forward address generator for generating integer write addresses;
    means for storing the source image in a memory according to the integer write addresses;
    a reverse address generator for generating a read address for each pixel of the target image along a line of the target image according to parameters for a continuous function equation derived from the transform function, the parameters being updated at least once per line and the read address having an integer portion and a fractional portion;
    means for accessing the memory to obtain a plurality of source pixel values according to the integer portion of each read address; and
    means for interpolating the source pixel values according to the fractional portion of each read address to obtain a corresponding target image pixel value.

* * * * *